United States Patent
Huang et al.

(10) Patent No.: US 10,366,535 B2
(45) Date of Patent: Jul. 30, 2019

(54) METHOD FOR GENERATING HEXAHEDRAL MESH BASED ON CLOSED-FORM POLYCUBE

(71) Applicant: ZHEJIANG UNIVERSITY, Hangzhou, Zhejiang (CN)

(72) Inventors: Jin Huang, Zhejiang (CN); Hujun Bao, Zhejiang (CN); Weiwei Xu, Zhejiang (CN); Xianzhong Fang, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 174 days.

(21) Appl. No.: 15/529,857

(22) PCT Filed: Nov. 25, 2016

(86) PCT No.: PCT/CN2016/107179
§ 371 (c)(1),
(2) Date: May 25, 2017

(87) PCT Pub. No.: WO2017/185730
PCT Pub. Date: Nov. 2, 2017

(65) Prior Publication Data
US 2019/0096127 A1    Mar. 28, 2019

(30) Foreign Application Priority Data

Apr. 27, 2016    (CN) .......................... 2016 1 0273300

(51) Int. Cl.
G06T 17/00    (2006.01)
G06T 17/20    (2006.01)
G06T 19/20    (2011.01)

(52) U.S. Cl.
CPC .......... *G06T 17/205* (2013.01); *G06T 17/005* (2013.01); *G06T 19/20* (2013.01); *G06T 2219/2021* (2013.01)

(58) Field of Classification Search
CPC .................... G06T 17/00–30; G06T 19/00–20
See application file for complete search history.

(56) References Cited

U.S. PATENT DOCUMENTS 9,972,128 B2 *    5/2018    Gregson ................. G06T 17/20
2014/0028673 A1   1/2014    Gregson et al.
(Continued)

FOREIGN PATENT DOCUMENTS

CN    102254351 A    11/2011
CN    103824331 A    5/2014
(Continued)

OTHER PUBLICATIONS

Huang, Jin, et al. "L1-Based Construction of Polycube Maps from Complex Shapes.";ACM Transactions on Graphics (TOG);33.3 (2014): 25. (Year: 2014).*
(Continued)

*Primary Examiner* — Daniel F Hajnik

(57) ABSTRACT

A method for generating a hexahedral mesh based on a closed-form polycube includes steps of: converting a surface triangular mesh into a tetrahedral mesh; obtaining an initial 3-dimensional frame field; according surface normal constraint, generating a smooth frame field without singular line inside the model; extracting a transition relation on the cut surface based on the smooth frame field; providing Poisson optimization on cut model based on the frame field for obtaining a preliminary parameterized result; using L1-optimization for forming a final closed-form polycube; optimizing with an mixed integer for obtaining a final parameterized result; and extracting the hexahedral mesh. The method automatically generates the hexahedral mesh from (Continued)

the triangular mesh, and has nothing to do with an initial position of an object, which is able to better satisfy a characteristic constraint of the model; and for a model with complex topology, high quality hexahedral mesh is available.

9 Claims, 4 Drawing Sheets

(56) References Cited

U.S. PATENT DOCUMENTS

| 2016/0240001 A1* | 8/2016 | Sheffer | G06T 17/20 |
| 2017/0024931 A1* | 1/2017 | Sheffer | G06T 17/205 |

FOREIGN PATENT DOCUMENTS

| CN | 105957151 A | 9/2016 |
| JP | 2012198847 A | 10/2012 |

OTHER PUBLICATIONS

Gregson, James, Alla Sheffer, and Eugene Zhang. "All-hex mesh generation via volumetric polycube deformation."; Computer graphics forum. vol. 30. No. 5. Oxford, UK: Blackwell Publishing Ltd, 2011. (Year: 2011).*

Li, Yufei, et al. "All-hex meshing using singularity-restricted field.";ACM Transactions on Graphics (TOG);31.6 (2012): 177. (Year: 2012).*

Huang, Jin, et al. "Boundary aligned smooth 3D cross-frame field.";ACM transactions on graphics (TOG). vol. 30. No. 6. ACM, 2011. (Year: 2011).*

Jiang, Tengfei, et al. "Frame field singularity correctionfor automatic hexahedralization."; IEEE Transactions on Visualization and Computer Graphics; 20.8 (2014): 1189-1199. (Year: 2014).*

Sorkine, Olga, and Marc Alexa. "As-rigid-as-possible surface nnodeling.";Symposiunn on Geometry processing. vol. 4. 2007. (Year: 2007).*

Peng et al., Local to Global Optimization Algorithm for Hexahedral Mesh Quality. Journal of Mechanical Engineering, Dec. 31, 2014, vol. 50, No. 23, p. 140-146.

* cited by examiner

METHOD FOR GENERATING HEXAHEDRAL MESH BASED ON CLOSED-FORM POLYCUBE

CROSS REFERENCE OF RELATED APPLICATION

This is a U.S. National Stage under 35 U.S.C 371 of the International Application PCT/CN2016/107179, filed Nov. 25, 2016, which claims priority under 35 U.S.C. 119(a-d) to CN 201610273300.6, filed Apr. 27, 2016.

BACKGROUND OF THE PRESENT INVENTION

Field of Invention

The present invention relates to a method for processing a 3-dimensional mesh, and more particularly to a method for generating a hexahedral mesh based on a closed-form polycube.

Description of Related Arts

Hexahedral meshes have a wide range of applications in computer graphics and in industries such as CAD, physical simulation, geometrical construction, and so on. However, there are still many problems in automating the generation of hexahedral meshes, such as the low degree of automation and the inability to avoid global degradation, and the resulting hexahedral mesh quality is not high. Conventionally, fully automatic hexahedral mesh generation is still a big challenge.

The conventional hexahedral mesh generation methods have their own shortcomings:

1, For a hexahedral mesh generation method based on polycubes, it is necessary to assume that the initial orientation of the model is good, see [Gregson et al. 2011 All-hex mesh generation via volumetric polycube deformation In Computer graphics forum, vol. 30, Wiley Online Library, 1407-1416]. Furthermore, the method lacks user control, see [Gregson et al. 2011 All-hex mesh generation via volumetric polycube deformation In Computer graphics forum, vol. 30, Wiley Online Library, 1407-1416. Tarini et al. 2004 Polycube-maps. In ACM Transactions on Graphics (TOG), vol. 23, ACM, 853-860].

2, For complex models, such as high genus and models with complex feature line constraint, it is impossible to get a high-quality hexahedral mesh based on polycube. [Huang et al 2014. L1 based construction of polycube maps from complex shapes. ACM TOG 33, 3, 25:1-11] discloses a polycube generation method based on L1 optimization, which can be used for hexahedral mesh generation. However, the method is based on the global uniform frame field, and the quality of the hexahedral mesh is not high.

3, [Li et al. 2012. All-hex meshing using singularity-restricted field. ACM TOG 31, 6, 177:1-11] discloses a hexahedral mesh generation method based on a three-dimensional frame field with singularity. However, the method requires a grid modification operation for many degradations, and has poor robustness, leading to difficulty in handling of complex global degradation.

SUMMARY OF THE PRESENT INVENTION

According to defects of conventional technologies, an object of the present invention is to provide a method for generating a hexahedral mesh based on a closed-form polycube which not only automatically generates a closed-form polycube by mapping from a triangular mesh, but also is independent of a position of a model, so as to obtain a high quality hexahedral mesh for a model with a complex topological structure.

Accordingly, in order to accomplish the above object, the present invention comprises steps of:

1) inputting a triangular mesh model, and converting into a tetrahedral mesh model;

2) obtaining all handles on surface meshes, and using the handles as a boundary of a cut surface; establishing a fitting surface and cutting the fitting surface to obtained the cut surface; cutting the tetrahedral mesh model into a model $M_c$ with a first Betti number of 0;

3) defining a frame $R_t$ in each of tetrahedrons of the model $M_c$, wherein the frame $R_t$ is a 3×3 matrix; using a method in [Huang et al. 2011. Boundary aligned smooth 3d cross-frame field. ACM TOG] for obtaining an initial 3-dimensional frame field R, establishing a minimum spanning tree with the tetrahedrons as nodes in the model $M_c$ which is cut, and globally aligning for the 3-dimensional frame field R, so as to obtain an aligned 3-dimensional frame field;

4) according to cut tetrahedral mesh model surface normal alignment constraint and cut model internal frame field smoothness requirements both inputted by a user, establishing and solving a frame field optimizing formula, so as to obtain a smooth frame field without singular line inside the model;

5) extracting a transition relation on the cut surface based on the smooth frame field obtained in the step 4);

6) providing Poisson reconstruction based on the smooth frame field obtained in the step 4) and the transition relation on the cut surface obtained in the step 5); constructing and solving a Poisson optimizing formula for obtaining a preliminary parameterized result;

7) according to the transition relation obtained in the step 5) and a polycube generating method optimized by a norm $l_1$ according to [Huang et la. 2014. $l_1$ based construction of polycube maps from complex shapes. ACM TOG], establishing and solving a L1-optimized formula for forming the closed-form polycube, wherein the L1-optimized formula is:

$$\min_{\overline{\chi}} E_{arap} + w_{align} E_{align} + w_{diff} E_{diff}$$

$$\text{s.t. } \overline{A}(\overline{\chi}(M)) = A_{\partial M}$$

$$\Pi_{a,b} \overline{\chi}_a(e) = \overline{\chi}_b(e), \forall e \in t_a \cap t_b \in C$$

wherein $\overline{A}(\overline{\chi}(M))$ represents a surface area of the tetrahedral mesh model in a parameter domain, $A_{\partial M}$ represents a surface area of an original tetrahedral mesh model, $\overline{\chi}$ represents a mapping relation, C represents a collection of cut surface pieces; $E_{arap}$ represents ARAP energy, $E_{align}$ represents normal alignment energy, $E_{diff}$ represents normal difference energy, $w_{align}$ represents a normal alignment weight, $w_{diff}$ represents a normal difference weight, $\Pi_{a,b}$ represents a public plane transfer relation from a tetrahedron $t_a$ to a tetrahedron $t_b$, $\overline{\chi}_a(e)$ represents an image of an edge e in a parameter domain of $t_a$, $\overline{\chi}_b(e)$ represents an image of the edge e in a parameter domain of $t_b$, and e represents the edge of the cut surface;

8) according to a polycube result generated in the step 7), extracting a polycube surface normal; according to the polycube surface normal and the transition relation on the cut surface, optimizing with an mixed integer for obtaining a final parameterized result; and 9) extracting according to the final parameterized result for generating the hexahedral mesh.

In the step 4), the frame field optimizing formula is:

$$\min_R w_f E_s + w_c E_c + w_a E_A + w_d E_d + w_R E_R$$

wherein $w_f$ is a frame field smoothness weight, $w_c$ is a frame field smoothness weight at the cut surface, $w_a$ is a surface normal alignment weight, $w_d$ is a surface normal smoothness weight, $w_R$ is a frame field orthogonal constraint weight, $E_s$ is frame field smoothness energy, $E_c$ is frame field smoothness energy at the cut surface, $E_A$ normal alignment energy, $E_d$ is surface normal smoothness energy, and $E_R$ is frame field orthogonal constraint energy.

In the step 5), the transition relation on the cut surface is extracted with a following formula, and an optimized rotation of 24 kinds of cube symmetrical rotations is selected as an optimized $\Pi_k$:

$$\Pi_k = \mathrm{argmin}_{\Pi_k} \sum_{t_i \cap t_j \in c_k} A_{t_i \cap t_j} \| \Pi_k R_{t_i} - R_{t_j} \|^2$$

wherein $c_k$ is a piece collection of a number k cut surface, $t_i \cap t_j$ is a public plane of a tetrahedron $t_i$ and a tetrahedron $t_j$, $A_{t_i \cap t_j}$ is an area of the public plane, $R_{t_i}$ is a frame defined in the tetrahedron $t_i$, and $R_{t_j}$ is a frame defined in the tetrahedron $t_j$.

In the step 6), the Poisson optimizing formula is:

$$\min_{\overline{\chi}} \int_M \| \nabla \overline{\chi} - R \|^2$$

$$\text{s.t. } \Pi_{a,b} \overline{\chi}_a(e) = \overline{\chi}_b(e), \forall e \in t_a \cap t_b \in C$$

wherein $\Pi_{a,b}$ represents the public plane transfer relation from the tetrahedron $t_a$ to the tetrahedron $t_b$, $\overline{\chi}$ represents mapping defined on the model, e represents the edge of the cut surface, C represents the collection of the cut surface pieces, $\nabla \overline{\chi}$ represents a deformation gradient of mapping, R represents the smooth frame field obtained in the step 4), and M represents an inputted tetrahedral mesh model.

The frame field smoothness energy $E_s$, the frame field smoothness energy $E_c$ at cut boundaries, the normal alignment energy $E_A$, the surface normal smoothness energy $E_d$, and the frame field orthogonal constraint energy $E_R$ are calculated as follows:

the frame field smoothness energy $E_s$ is:

$$\sum_{t_i \cap t_j \in F \setminus C} \frac{V_{t_i} + V_{t_j}}{4 V_F d^2_{t_i, t_j}} \| R_{t_i} - R_{t_j} \|^2$$

wherein C is the collection of the cut surface pieces, $d_{t_i, t_j}$ is a barycenter distant between a tetrahedron $t_i$ and a tetrahedron $t_j$, h(r) is a rotation-irrelevant function, $V_{t_i}$ is a volume of $t_i$, $V_{t_j}$ is a volume of $t_j$, and $V_F$ is a normalized weight of the frame field smoothness energy $E_s$;

the frame field smoothness energy $E_c$ at the cutting boundaries is:

$$\sum_{t_i \cap t_j \in C} \frac{V_{t_i} + V_{t_j}}{4 V_C d^2_{t_i, t_j}} \sum_{k=0}^{3} h\left( \left( R_{t_i}^T R_{t_j} \right)_k \right)$$

wherein C is the collection of the cut surface pieces, $d_{t_i, t_j}$ is the barycenter distant between the tetrahedron $t_i$ and the tetrahedron $t_j$, h(r) is the rotation-irrelevant function, $V_C$ is a normalized weight of the frame field smoothness energy $E_c$ at the cut surface, k is a column number of a matrix $R_{t_i}^T R_{t_j}$, $R_{t_i}^T$ is transition of $R_{t_i}$;

the normal alignment energy $E_A$ is:

$$\sum_{f \in \partial M} \frac{A_f}{A_{\partial M}} \| R_t n_f \|_1$$

wherein $\|.\|_1$ is the norm $l_1$, $\partial M$ is a boundary of a tetrahedral mesh M, $R_t$ is a frame defined in a tetrahedron t, f is a public plane of the tetrahedron t and $\partial M$, $A_f$ is an area of the public plane f of the tetrahedron t and $\partial M$, $n_f$ is a normal of the public plane f;

the above formula is optimized using an approximate replacement $\|u\|_1 \approx \sqrt{u^2 + \epsilon}$, $\epsilon = 10^{-3}$;

the surface normal smoothness energy $E_d$ is:

$$\sum_{f_i \cap f_j = e \in \partial M} \frac{A_{f_i} + A_{f_j}}{3 A_{\partial M}} \| R_{t_i} n_{f_i} - R_{t_j} n_{f_j} \|^2,$$

$$f_i = t_i \cap \partial M, f_j = t_j \cap \partial M$$

wherein $\partial M$ is the boundary of the tetrahedral mesh M, $f_i$ is a public plane of the tetrahedron $t_i$ and $\partial M$, $f_1$ is a public plane of the tetrahedron $t_j$ and $\partial M$, $n_{f_i}$ and $n_{f_j}$ are a normal of $f_i$ and a normal of $f_j$, $A_{f_i}$ is an area of $f_i$, $A_{f_j}$ is an area of $f_j$, $R_{t_i}$ is a frame defined i the tetrahedron $t_i$, and $R_{t_j}$ is a frame defined i the tetrahedron $t_j$;

the frame field orthogonal constraint energy $E_R$ is:

$$\sum_{t \in M} \frac{V_t}{V_M} \| R_t^T R_t - I \|^2$$

wherein t is a tetrahedron in an inputted tetrahedral mesh, $V_t$ is a volume of t, $V_M$ is a total volume of the inputted tetrahedral mesh M, and I is a 3×3 unit matrix.

Weights of the above energy are:

$$w_a = 0.1, w_d = 0.01, w_R = 1, V_F = \Sigma_{t_i \cap t_j \in F \setminus C} \frac{V_{t_i} + V_{t_j}}{4 d^2_{t_i, t_j}},$$

$$V_C = \Sigma_{t_i \cap t_j \in C} \frac{V_{t_i} + V_{t_j}}{4 d^2_{t_i, t_j}}, w_f = \frac{V_F}{V_F + V_C}, w_c = \frac{V_C}{V_F + V_C},$$

wherein $V_{t_i}$ is the volume of the tetrahedron $t_i$, $V_{t_j}$ is the volume of the tetrahedron $t_j$, $V_C$ is the normalized weight of the frame field smoothness energy $E_c$ at the cut surface, and $V_F$ is the normalized weight of the frame field smoothness energy $E_s$.

The rotation-irrelevant function h(r) is calculated by:

$$h(r)=r_x^2 r_y^2 + r_y^2 r_z^2 + r_z^2 r_x^2, r=(r_x,r_y,r_z)$$

wherein $r=(r_x,r_y,r_z)$ is a 3-dimensional vector, $r_x$, $r_y$, $r_z$ are respectively x, y and z coordinates of the 3-dimensional vector.

In the step 4), the aligned 3-dimensional frame field obtained in the step 3) is used as an initial value, and an LBFGS optimizer in a public database Alglib is used to optimize the frame field optimizing formula.

In the step 6), an IPOPT method is used for solving.

In the step 7), solving the L1-optimized formula specifically comprises a step of solving the preliminary parameterized result in the step 6) with an SQP method for obtaining the closed-form polycube.

In the step 7), energy in the L1-optimized formula is defined as follows.

The ARAP (as-rigid-as-possible) energy $E_{arap}$ is:

$$E_{arap} = \sum_{t \in M} \frac{V_t}{V_M} \|\overline{V_{\chi_t}} - \text{polar}(\overline{V_{\chi_t}})\|^2$$

wherein polar($\overline{\nabla 102}_t$) is a rotation portion of the deformation gradient $\overline{\nabla 102}_t$, $V_t$ is the volume of t, and $V_M$ is the total volume of the inputted tetrahedral mesh M.

The normal alignment energy $E_{align}$ is:

$$E_{align} = \sum_{f \in \partial M} \frac{1}{2A_{\partial M}} \|(\overline{x}_j^f - \overline{x}_i^f) \times (\overline{x}_k^f - \overline{x}_i^f)\|_1$$

wherein $A_{\partial M}$ is a total surface area of M, $\partial M$ is a surface triangular mesh of the inputted tetrahedral mesh, $A_f$ is the area of f, and $(\overline{x}_i^f, \overline{x}_j^f, \overline{x}_k^f)$ is three vertex coordinates of the surface piece f in the parameter domain.

The normal difference energy $E_{diff}$ is:

$$E_{diff} = \sum_{f_i \cap f_j = e \in F \setminus C} \frac{A_{f_i} + A_{f_j}}{3A_{\partial M}} \|\overline{n}_i - \overline{n}_j\|^2 + \sum_{f_i \cap f_j = e \in C} \frac{A_{f_i} + A_{f_j}}{3A_{\partial M}} \|\Pi_{ij}\overline{n}_i - \overline{n}_j\|^2$$

wherein $\overline{n}_i$ and $\overline{n}_j$ are normals of the surface piece $f_i$ and the surface piece $f_j$ in the parameter domain, $\Pi_{ij}$ is a transition relation between the two surface pieces, $A_{f_i}$ is the area of $f_i$, $A_{f_j}$ is the area of $f_j$, and F is a surface piece collection of the model M.

Compared with conventional technologies, the present invention has advantages as follows:

The method of the present invention has nothing to do with an initial position of an object, and is able to better satisfy a characteristic constraint of the model; further, for a model with complex topology, or a model with a characteristic line, high quality hexahedral mesh is available; L1-optimization is similar to allowing the user to control details of the polycube, thereby controlling a structure of the hexahedral mesh.

DETAILED DESCRIPTION OF THE PREFERRED EMBODIMENT

Figure 1:
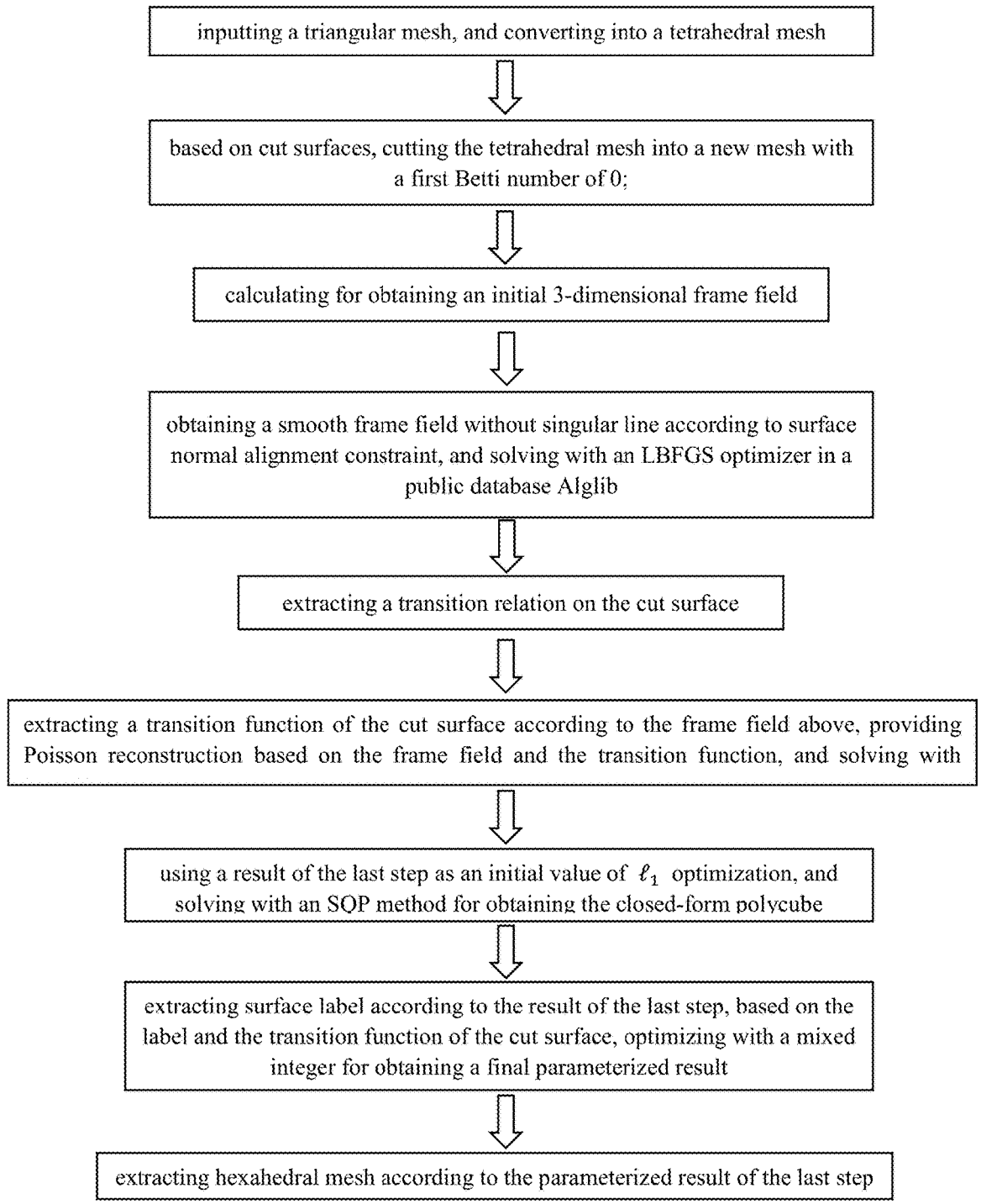
FIG. 1 is a flow chart of the present invention.

Referring to the drawings, the present invention is further illustrated.

Figure 2:
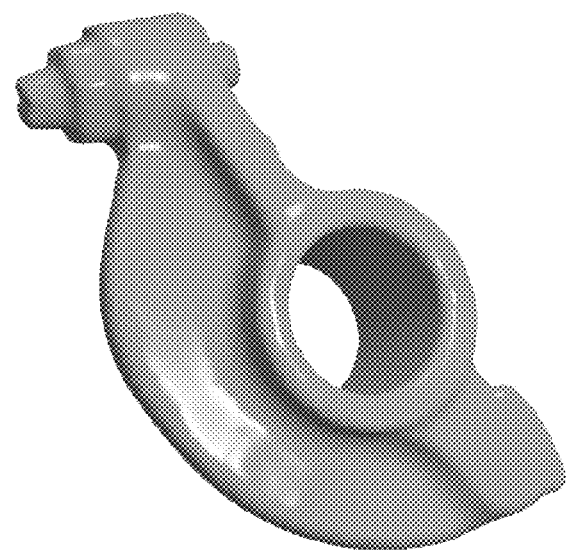
FIG. 2 illustrates an inputted model according to an embodiment of the present invention.
Figure 3:
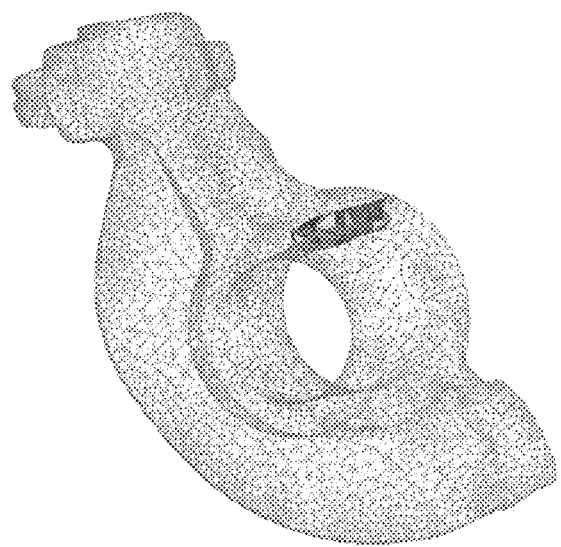
FIG. 3 illustrates a cut surface result according to the embodiment when converting the inputted model to a tetrahedral mesh.
Figure 4:
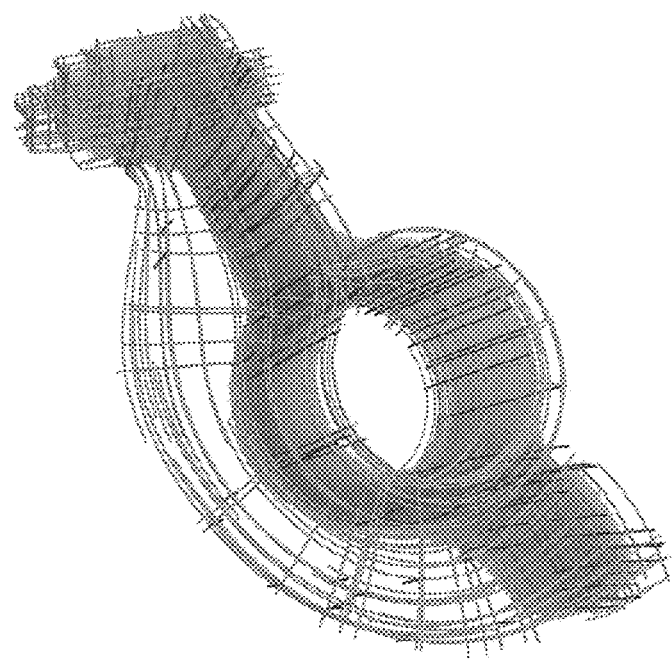
FIG. 4 is a sketch view of an optimized 3-dimensional frame field according to the embodiment.
Figure 5:
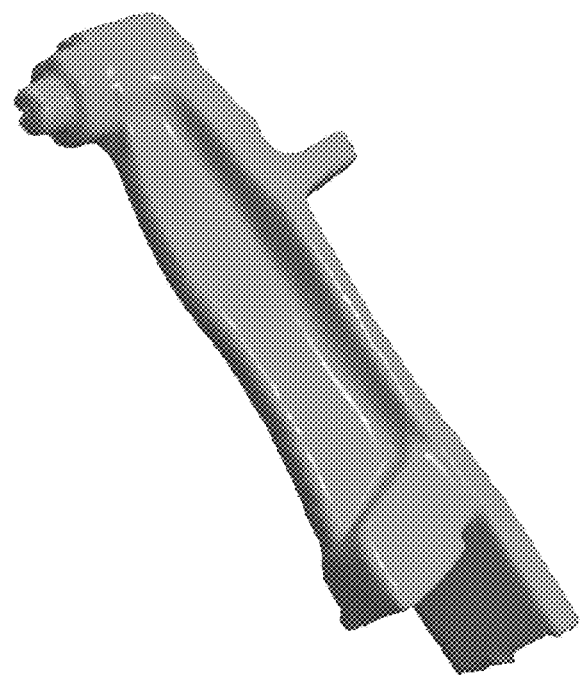
FIG. 5 illustrates a result of Poisson reconstruction according to the embodiment.

An embodiment of a method of the present invention is as follows:

1) inputting a triangular mesh model as shown in FIG. 2, and converting into a tetrahedral mesh model as shown in FIG. 3;

2) obtaining all handles on surface meshes, and using the handles as a boundary of a cut surface; establishing a fitting surface and cutting the fitting surface to obtained the cut surface; referring to FIG. 4, cutting the tetrahedral mesh model into a model $M_c$ with a first Betti number of 0;

3) defining a frame $R_t$ in each of tetrahedrons t of a tetrahedral mesh M of the model $M_c$, wherein the frame $R_t$ is a 3×3 matrix; using a method in [Huang et al. 2011. Boundary aligned smooth 3d cross-frame field. ACM TOG] for obtaining an initial 3-dimensional frame field R, establishing a minimum spanning tree with the tetrahedrons as nodes in the model $M_c$ which is cut, and globally aligning for the 3-dimensional frame field R, so as to obtain an aligned 3-dimensional frame field as shown in FIG. 5;

4) according to cut tetrahedral mesh model surface normal alignment constraint and cut model internal frame field smoothness requirements both inputted by a user, establishing a frame field optimizing formula, wherein the aligned 3-dimensional frame field obtained in the step 3) is used as an initial value, and an LBFGS optimizer in a public database Alglib is used to solve the frame field optimizing formula, so as to obtain a smooth frame field without singular line inside the model;

5) extracting a transition relation on the cut surface based on the smooth frame field obtained in the step 4), wherein according to the embodiment, the transition relation is a rotation matrix:

$$\begin{bmatrix} 0 & 0 & -1 \\ 0 & 1 & 0 \\ 1 & 0 & 0 \end{bmatrix};$$

Figure 6:
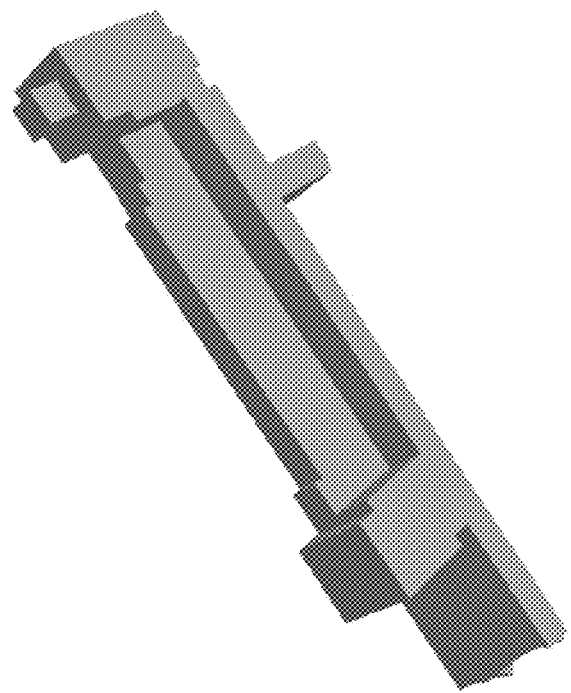
FIG. 6 illustrates a closed-from polycube according to the embodiment.
Figure 7:
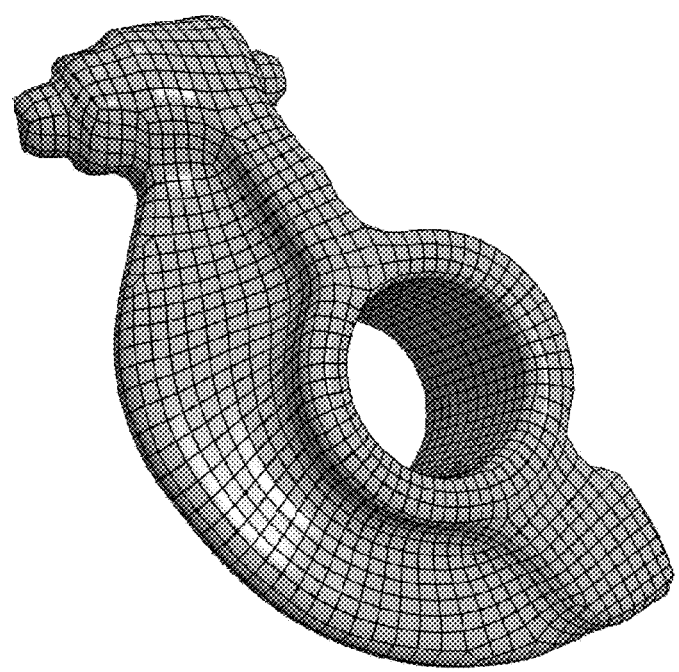
FIG. 7 illustrates a final hexahedral mesh according to the embodiment.

6) providing Poisson reconstruction based on the smooth frame field obtained in the step 4) and the transition relation on the cut surface obtained in the step 5); constructing and solving a Poisson optimizing formula with an IPOPT method for obtaining a preliminary parameterized result as shown in FIG. 5;

7) according to the transition relation obtained in the step 5) and a polycube generating method optimized by a norm $l_1$ according to [Huang et la. 2014. $l_1$ based construction of polycube maps from complex shapes. ACM TOG], establishing a L1-optimized formula, solving the preliminary parameterized result in the step 6) with an SQP method for obtaining the closed-form polycube as shown in FIG. 6;

8) according to a polycube result generated in the step 7), extracting a polycube surface normal; according to the polycube surface normal and the transition relation on the cut surface, optimizing with a mixed integer for obtaining a final parameterized result; and 9) extracting according to the final parameterized result for generating the hexahedral mesh as shown in FIG. 7.

Compared with conventional polycube based method, the final hexahedral mesh considers topological constraints, and has fewer angular points, wherein hexahedral units are of higher quality and features of the model are better kept.

The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for generating a hexahedral mesh based on a closed-form polycube, comprising steps of:
   1) inputting a triangular mesh model, and converting into a tetrahedral mesh model;
   2) obtaining all handles on surface meshes, and using the handles as a boundary of a cut surface; establishing a fitting surface and cutting the fitting surface to obtained the cut surface; cutting the tetrahedral mesh model into a model $M_c$ with a first Betti number of 0;
   3) defining a frame $R_t$ in each of tetrahedrons of the model $M_c$, wherein the frame $R_t$ is a 3×3 matrix; using a method for obtaining an initial 3-dimensional frame field R, establishing a minimum spanning tree with the tetrahedrons as nodes in the model $M_c$ which is cut, and globally aligning for the 3-dimensional frame field R, so as to obtain an aligned 3-dimensional frame field;
   4) according to cut tetrahedral mesh model surface normal alignment constraint and cut model internal frame field smoothness requirements both inputted by a user, establishing and solving a frame field optimizing formula, so as to obtain a smooth frame field without singular line inside the model;
   5) extracting a transition relation on the cut surface based on the smooth frame field obtained in the step 4);
   6) providing Poisson reconstruction based on the smooth frame field obtained in the step 4) and the transition relation on the cut surface obtained in the step 5); constructing and solving a Poisson optimizing formula for obtaining a preliminary parameterized result;
   7) according to the transition relation obtained in the step 5) and a polycube generating method optimized by a norm $l_1$, establishing and solving a L1-optimized formula for forming the closed-form polycube, wherein the L1-optimized formula is:

$$\min_{\overline{\chi}} E_{arap} + w_{align} E_{align} + w_{diff} E_{diff}$$

$$\text{s.t. } \overline{A}(\overline{\chi}(M)) = A_{\partial M}$$

$$\Pi_{a,b} \overline{\chi}_a(e) = \overline{\chi}_b(e), \forall e \in t_a \cap t_b \in C$$

wherein $\overline{A}(\overline{\chi}(M))$ represents a surface area of the tetrahedral mesh model in a parameter domain, $A_{\partial M}$ represents a surface area of an original tetrahedral mesh model, $\overline{\chi}$ represents a mapping relation, C represents a collection of cut surface pieces; $E_{arap}$ represents ARAP energy, $E_{align}$ represents normal alignment energy, $E_{diff}$ represents normal smoothness energy, $w_{align}$ represents a normal alignment weight, $w_{diff}$ represents a normal smoothness weight, $\Pi_{a,b}$ represents a public plane transfer relation from a tetrahedron $t_a$ to a tetrahedron $t_b$, $\overline{\chi}_a(e)$ represents an image of an edge e in a parameter domain of $t_a$, $\overline{\chi}_b(e)$ represents an image of the edge e in a parameter domain of $t_b$, and e represents the edge of the cut surface;

8) according to a polycube result generated in the step 7), extracting a polycube surface normal; according to the polycube surface normal and the transition relation on the cut surface, optimizing with a mixed integer for obtaining a final parameterized result; and 9) extracting according to the final parameterized result for generating the hexahedral mesh.

2. The method, as recited in claim 1, wherein in the step 4), the frame field optimizing formula is:

$$\min_R w_f E_s + w_c E_c + w_a E_A + w_d E_d + w_R E_R$$

wherein $w_f$ is a frame field smoothness weight, $w_c$ is a frame field smoothness weight at the cut surface, $w_a$ is a surface normal alignment weight, $w_d$ is a surface normal smoothness weight, $w_R$ is a frame field orthogonal constraint weight, $E_s$ is frame field smoothness energy, $E_c$ is frame field smoothness energy at the cut surface, $E_A$ normal alignment energy, $E_d$ is surface normal smoothness energy, and $E_R$ is frame field orthogonal constraint energy.

3. The method, as recited in claim 2, wherein the frame field smoothness energy $E_s$, the frame field smoothness energy $E_c$ at cutting boundaries, the normal alignment energy $E_A$, the surface normal smoothness energy $E_d$, and the frame field orthogonal constraint energy $E_R$ are calculated as follows:

the frame field smoothness energy $E_s$ is:

$$\sum_{t_i \cap t_j \notin C} \frac{V_{t_i} + V_{t_j}}{4 V_F d_{t_i, t_j}^2} \|R_{t_i} - R_{t_j}\|^2$$

wherein C is the collection of the cut surface pieces, $d_{t_i, t_j}$ is a barycenter distant between a tetrahedron $t_i$ and a tetrahedron $t_j$, h(r) is a rotation-irrelevant function, $V_{t_i}$ is a volume of $t_i$, $V_{t_j}$ is a volume of $t_j$, and $V_F$ is a normalized weight of the frame field smoothness energy $E_s$;

the frame field smoothness energy $E_c$ at the cutting boundaries is:

$$\sum_{t_i \cap t_j \in C} \frac{V_{t_i} + V_{t_j}}{4 V_c d_{t_i, t_j}^2} \sum_{k=0}^{3} h\big((R_{t_i}^T R_{t_j})_k\big)$$

wherein C is the collection of the cut surface pieces, $d_{t_i, t_j}$ is the barycenter distant between the tetrahedron $t_i$ and the tetrahedron $t_j$, k(r) is the rotation-irrelevant function, $V_C$ is a normalized weight of the frame field smoothness energy $E_c$ at the cut surface, k is a column number of a matrix $R_{t_i}^T R_{t_j}$, $R_{t_j}^T$ is transition of $R_{t_j}$;
the normal alignment energy $E_A$ is:

$$\sum_{f \in \partial M} \frac{A_f}{A_{\partial M}} \|R_t n_f\|_1$$

wherein $\|.\|_1$ is the norm $l_1$, $\partial M$ is a boundary of a tetrahedral mesh M, $R_t$ is a frame defined in a tetrahedron t, f is a public plane of the tetrahedron t and $\partial M$, $A_f$ is an area of the public plane f of the tetrahedron t and $\partial M$, $n_f$ is a normal of the public plane f;
the above formula is optimized using an approximate replacement $\|u\|_1 \approx \sqrt{u^2 + \epsilon}$, $\epsilon = 10^{-3}$;
the surface normal smoothness energy $E_d$ is:

$$\sum_{f_i \cap f_j = e \in \partial M} \frac{A_{f_i} + A_{f_j}}{3 A_{\partial M}} \|R_{t_i} n_{f_i} - R_{t_j} n_{f_j}\|^2,$$

$$f_i = t_i \cap \partial M, f_j = t_j \cap \partial M$$

wherein $\partial M$ is the boundary of the tetrahedral mesh M, $f_i$ is a public plane of the tetrahedron $t_i$ and $\partial M$, $f_j$ is a public plane of the tetrahedron $t_j$ and $\partial M$, $n_{f_i}$ and $n_{f_j}$ are a normal of $f_i$ and a normal of $f_j$, $A_{f_i}$ is an area of $f_i$, $A_{f_j}$ is an area of $f_j$, $R_{t_i}$ is a frame defined i the tetrahedron $t_i$, and $R_{t_j}$ is a frame defined i the tetrahedron $t_j$;
the frame field orthogonal constraint energy $E_R$ is:

$$\sum_{t \in M} \frac{V_t}{V_M} \|R_t^T R_t - I\|^2$$

wherein t is a tetrahedron in an inputted tetrahedral mesh, $V_t$ is a volume of t, $V_M$ is a total volume of the inputted tetrahedral mesh M, and I is a 3×3 unit matrix.

4. The method, as recited in claim 3, wherein the rotation-irrelevant function h(r) is calculated by:

$h(r) = r_x^2 r_y^2 + r_y^2 r_z^2 + r_z^2 r_x^2, r = (r_x, r_y, r_z)$ wherein $r = (r_x, r_y, r_z)$ is a 3-dimensional vector, $r_x, r_y, r_z$ are respectively x, y and z coordinates of the 3-dimensional vector.

5. The method, as recited in claim 1, wherein in the step 5), the transition relation on the cut surface is extracted with a following formula, and an optimized rotation of 24 kinds of cube symmetrical rotations is selected as an optimized $\Pi_k$:

$$\Pi_k = \mathrm{argmin}_{\Pi_k} \sum_{t_i \cap t_j \in c_k} A_{t_i \cap t_j} \|\Pi_k R_{t_i} - R_{t_j}\|^2$$

wherein $c_k$ is a piece collection of a number k cut surface, $t_i \cap t_j$ is a public plane of a tetrahedron $t_i$ and a tetrahedron $t_j$, $A_{t_i \cap t_j}$ is an area of the public plane, $R_{t_i}$ is a frame defined in the tetrahedron $t_i$, and $R_{t_j}$ is a frame defined in the tetrahedron $t_j$.

6. The method, as recited in claim 1, wherein in the step 6), the Poisson optimizing formula is:

$$\min_{\overline{\chi}} \int_M \|\overline{\nabla \chi} - R\|^2$$

s.t. $\Pi_{a,b} \overline{\chi}_a(e) = \overline{\chi}_b(e), \forall e \in t_a \cap t_b \in C$ wherein $\Pi_{a,b}$ represents the public plane transfer relation from the tetrahedron $t_a$ to the tetrahedron $t_b$, $\overline{\chi}$ represents mapping defined on the model, e represents the edge of the cut surface, C represents the collection of the cut surface pieces, $\overline{\nabla \chi}$ represents a deformation gradient of mapping, R represents the smooth frame field obtained in the step 4), and M represents an inputted tetrahedral mesh model.

7. The method, as recited in claim 1, wherein in the step 4), the aligned 3-dimensional frame field obtained in the step 3) is used as an initial value, and an LBFGS optimizer in a public database Alglib is used to solve the frame field optimizing formula.

8. The method, as recited in claim 1, wherein in the step 6), an IPOPT method is used for solving.

9. The method, as recited in claim 1, wherein in the step 7), solving the L1-optimized formula specifically comprises a step of solving the preliminary parameterized result in the step 6) with an SQP method for obtaining the closed-form polycube.

* * * * *